United States Patent [19]
Choudhury et al.

[11] Patent Number: 5,475,682
[45] Date of Patent: Dec. 12, 1995

[54] METHOD OF REGULATING BACKPRESSURE TRAFFIC IN A PACKET SWITCHED NETWORK

[75] Inventors: Abhijit K. Choudhury, Scotch Plains; Ellen L. Hahne, Westfield, both of N.J.

[73] Assignee: AT&T Corp., Murray Hill, N.J.

[21] Appl. No.: 259,261

[22] Filed: Jun. 10, 1994

[51] Int. Cl.[6] .................................................. H04L 12/56
[52] U.S. Cl. ............................. 370/60; 370/94.1; 370/113
[58] Field of Search .......................... 370/60, 94.1, 94.2, 370/60.1, 17, 13, 94.3, 61, 68.1, 110.1

[56] References Cited

U.S. PATENT DOCUMENTS

| | | | |
|---|---|---|---|
| 5,144,619 | 9/1992 | Munter | 370/60.1 |
| 5,237,565 | 8/1993 | Henrion et al. | 370/60.1 |
| 5,247,513 | 9/1993 | Henrion et al. | 370/60 |
| 5,274,642 | 12/1993 | Widjaja et al. | 370/94.1 |
| 5,287,346 | 2/1994 | Bianchini, Jr. et al. | 370/60 |
| 5,303,232 | 4/1994 | Proctor et al. | 370/60 |
| 5,313,454 | 5/1994 | Bustini et al. | 370/60.1 |
| 5,335,224 | 8/1994 | Cole et al. | 370/94.1 |
| 5,400,329 | 3/1995 | Tokura et al. | 370/17 |

OTHER PUBLICATIONS

A. K. Choudhury et al., "Space Priority Management In A Shared Memory ATM Switch," *Proc. IEEE GLOBECOM'93*, Houston, Tex., Dec. 1993, pp. 1–9.

M. J. Karol et al., "Performance Of Hierarchical Multiplexing In ATM Switch Design," *Supercomm/ICC Conference Record.*, Chicago, Jun. 1992, pp. 0269–0275.

K. Y. Eng et al., "A High–Performance Prototype 2.5 Gb/S ATM Switch For Broadband Applications," *Proc.IEEE GLOBECOM*, vol. 1, (Orlando, Fla.), pp. 111–117, Dec. 1992.

S. Gianatti et al., "Performance Analysis Of Shared–buffered Banyan Networks Under Arbitrary Traffic Patterns," *INFOCOM*.

*Primary Examiner*—Douglas W. Olms
*Assistant Examiner*—Rickey Q. Ngo
*Attorney, Agent, or Firm*—Michele L. Conover; Kenneth M. Brown

[57] ABSTRACT

A method of regulating backpressure traffic in a packet switched network made up of a plurality of switching elements each having a local buffer memory identifies at least one switching element which succeeds at least one other switching element in a transmission path. The at least one succeeding switching element has a congested local buffer memory. A backpressure signal is transmitted to the at least one other switching element. Packets destined for the succeeding switching element are queued in the local buffer memory of the at least one other switching element. Next, it is determined when the occupancy of the local buffer memory for the other switching element has exceeded a predetermined threshold. In response to the exceeded predetermined threshold, the other switching element ignores the backpressure signal transmitted from the succeeding switching element and transmits the queued packets to the succeeding switching element.

20 Claims, 2 Drawing Sheets

METHOD OF REGULATING BACKPRESSURE TRAFFIC IN A PACKET SWITCHED NETWORK

BACKGROUND OF THE INVENTION

The present invention relates to a method of controlling the congestion of information on a network.

Networks comprised of high performance switching elements are important for the high-speed transport of information, which may include text, voice, and video information. Emerging networks, such as broadband integrated services digital networks (B-ISDN) are designed to support a variety of applications such as interactive and distributed audio, video and data communications. The principle transfer mode for B-ISDN is called asynchronous transfer mode (ATM). ATM is a high-bandwidth, low delay packet switching and multiplexing technique.

In the switching elements used by these types of networks, cells or packets of information are received by a plurality of input ports which transport the packets to predefined output ports. Many times, one or more of the switching elements receives packets faster that it can dispose of them. As a result, the packets build up in a local buffer memory associated with the switching element, causing an overflow situation. Methods used to manage buffer memory by either preventing an overflow situation or determining which packets of information will be lost include interstage buffer management schemes and intrastage buffer management schemes. Interstage buffer management schemes regulate the movement of packets between stages of switching elements by using available buffer memory upstream of the congested switching element to store packets intended for the congested element. Intrastage buffer management schemes regulate the movement of packets within a given stage by managing the competition between output queues within the stage.

An example of an interstage buffer management scheme is a backpressure control scheme. Backpressure control occurs when a switching element Y considers its local buffer memory to be too full. Switching element Y sends a backpressure signal to switching element X which is located immediately upstream of switching element Y. Information destined for switching element Y is stored in the buffer memory of switching element X. When the local buffer memory of switching element X becomes too full, it sends a backpressure signal to the switching element located immediately upstream and the process repeats itself. The process can be carried back all the way to the first switching element in the transmission path.

By using the backpressure control in this manner, all of the switching elements upstream of Y can become monopolized by the information destined for congested switching element Y, thereby hindering the overall throughput of information. As such, backpressure control schemes are limited because they only regulate in an upstream direction. The backpressure scheme causes the congestion originating from the downstream element to be propagated upstream, thereby preventing packets from being transmitted to other downstream elements which are not congested.

In networks comprised of switching elements having shared local buffer memory, overload situations may be overcome by using local or intrastage buffer management schemes. The local buffer management schemes include pushout, allocation and limit-based schemes. The local buffer management schemes manage competition between output queues within a given switching element.

The pushout scheme is used when switching element Y has a full local buffer memory. Switching element Y continues to receive any packets arriving from upstream switching element X. Space is made for the new packets in switching element Y's local buffer memory by pushing out a packet from the longest output queue in switching element Y. The new packet usurps the physical memory location of the pushed out packet, but the new packet can then be assigned to a different logical output queue. The pushout scheme allows a packet destined to a less congested output queue to reach its destination at the expense of packets in longer queues.

In the allocation scheme, each switching element allocates a small amount of its local buffer memory to each of its output queues. The remainder of the memory is shared among all of the output queues. A packet arriving from an upstream switching element is dropped only if the memory allocated to its output queue is full and the shared memory is also full.

The limit-based scheme is used to set a limit on the length of each individual output queue in the local buffer memory of a given switching element. A packet arriving from an upstream switching element is dropped if it is destined for an output queue which has reached its length limit. Arriving packets are also dropped if the local buffer memory is completely full, regardless of whether the destined output queue has reached its limit.

The local buffer management schemes are able to discriminate between the different output queues within the element so that congested output queues which are dominating the shared memory lose packets prior to output queues which are receiving a fewer number of packets. However, each of the local buffer management schemes described above is limited to regulating packet flow within the element and therefore is limited by the amount of memory available to the element.

SUMMARY OF THE INVENTION

In accordance with the present invention, a backpressure traffic control scheme is realized which affirmatively places a limit on the number of overflow packets which are accepted upstream of a congested switching element. As such, the buffer memory of the upstream elements is still available to the congested element but the congested element is not able to monopolize the memory of the upstream elements so that other downstream elements are not deprived.

In accordance with an embodiment of the invention, at least one switching element is identified which succeeds at least one other switching element in a particular transmission path. When the at least one succeeding switching element has a congested local buffer memory, a backpressure signal is transmitted to the at least one other switching element. Data destined for the succeeding switching element is queued in the local buffer memory of the at least one other switching element. A determination is made of when the occupancy of the local buffer memory for the other switching element has exceeded a predetermined threshold. In response to exceeding the predetermined threshold, the other switching element ignores the backpressure signal transmitted from the succeeding switching element and transmits the queued data to the succeeding switching element.

In accordance with another embodiment of the present invention, the restricted backpressure traffic control scheme described above is combined with a buffer management scheme which determines the manner in which the local buffer memory of the succeeding switching element is managed when the local buffer memory is congested. By combining the restricted backpressure method with a local buffer management scheme, upstream buffer memory is available to the congested element, and if a situation arises so that data are to be lost, the data loss is determined at the output queues of the succeeding switching element so that output queues which are monopolizing the memory are penalized before other output queues.

DETAILED DESCRIPTION

Figure 1:
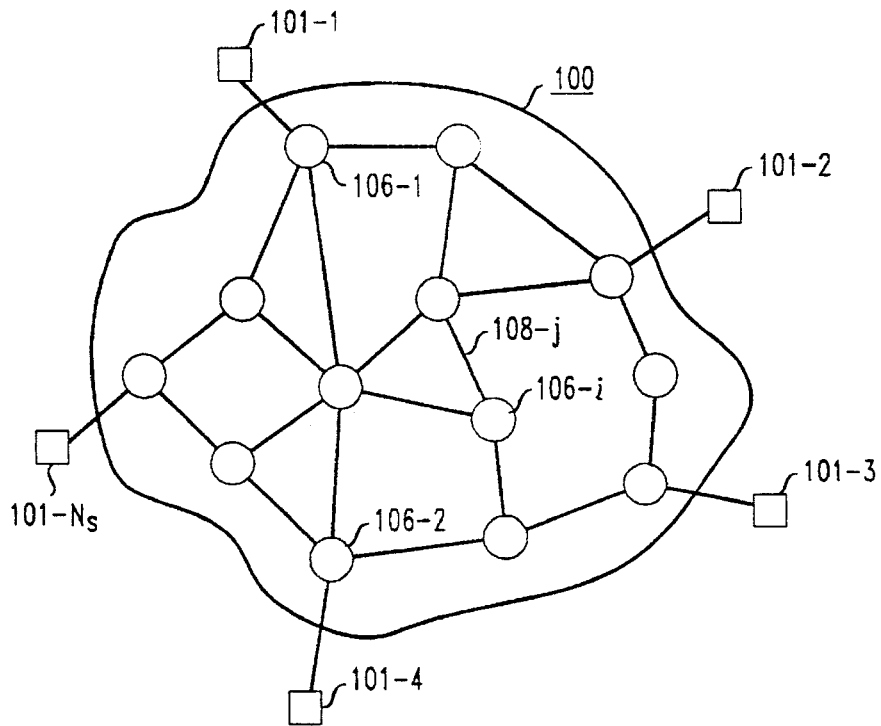
FIG. 1 is a diagram of a generalized data network having a plurality of nodes and connecting links.

FIG. 1 illustrates a typical high speed network 100 comprising switching nodes 106-i connected by data links 108-j. Inputs to the network are from user locations 101-k, where k=1, 2, ..., $N_s$. These inputs may be of any form, but are conveniently formatted at the user locations into packets for transmission to other user locations. The packets may be either fixed length or variable length packets. The switching nodes 106-i preferably comprise multistage switching elements which may or may not be hierarchical. In preferred embodiments, at least some of the transmission paths within switching node 106-i are acyclic.

Figure 2:
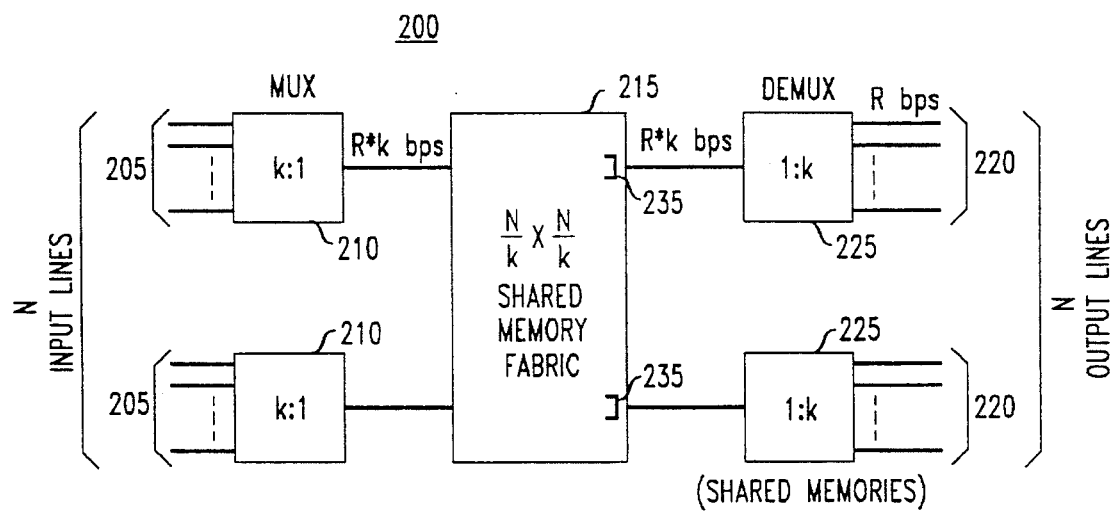
FIG. 2 is a diagram of an N×N shared memory switch which uses hierarchical multiplexing/demultiplexing.

FIG. 2 shows an N×N shared memory switch 200 which may be located at switching node 106-i and which includes hierarchically arranged switching elements which perform multiplexing, switching and demultiplexing operations. In such a switch, packets received by input lines 205 are multiplexed up to higher speeds by multiplexor switching elements 210. The packets are then received by a shared memory fabric 215 which routes the packets to the appropriate output port 235. The packets exit the fabric 215 and are demultiplexed down to lower speeds by demultiplexor switching elements 225. In the switch 200, k input lines 205, each of rate R, are multiplexed up to a R×k internal transmission rate before entering an $N/k \times N/k$ ATM core fabric 215 for switching. Each output port 235 of the fabric operates at an R×k transmission rate and is then demultiplexer to k output lines 220 of rate R.

Figure 3:
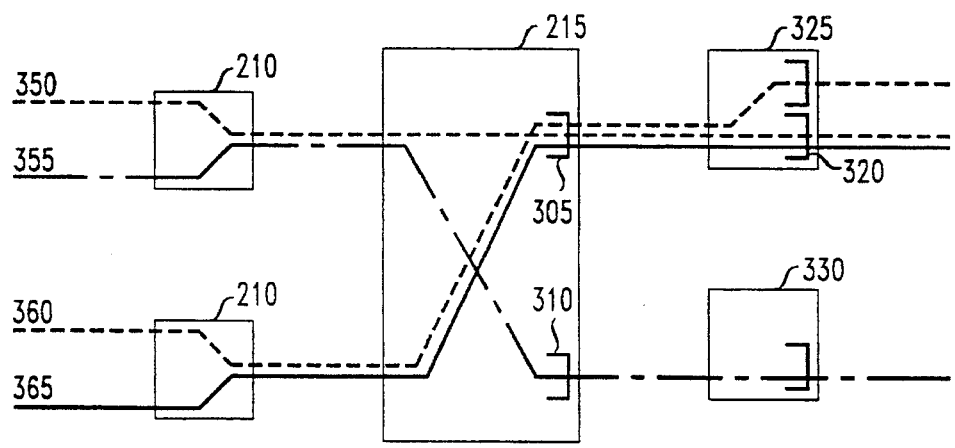
FIG. 3 is diagram of a shared memory switch in which one of the switching elements is congested.

FIG. 3 illustrates the routing of packets through shared memory switch 200. Packets of information, such as those contained in packet streams 350, 355, 360 and 365, are received by input lines 205 to multiplexing switching elements 210. The packets are multiplexed up to higher speeds and transported to a shared memory fabric 215. The shared memory fabric routes all of the packets destined to the output lines in the demultiplexor switching elements 325 and 330 through output queues 305 and 310 respectively. Once the packets are within the demultiplexor switching elements, they are routed to an output queue 320 and transmitted over the network to their destination.

As illustrated in FIG. 3, if multiple packet streams, such as streams 350 and 365, are directed to the same output queue of a switching element as is the case with output queue 320 of switching element 325, the output queue 320 may become congested. This condition may ultimately result in switching element 325 becoming congested. When such a condition occurs, switching element 325 transmits a backpressure signal to the switching element immediately upstream from it, in this case memory fabric 215, which causes the memory fabric to hold onto packets destined for switching element 325.

The determination of when a switching element becomes congested may be dependent on many factors. Typically, a switching element is determined to be congested when its buffer is full. Other factors may arise if an intrastage buffer management scheme is combined with the thresholded backpressure scheme as is described in detail hereinafter.

Each upstream element, in this case memory fabric 215, includes a backpressure threshold which determines the portion of the local buffer memory of the upstream element which can be used by the congested switching element to store packets. Once the buffer occupancy of the upstream switching element 215 exceeds the threshold, the backpressure signal is ignored and the stored packets are sent to the congested switching element 325. Congested element 325 drops those packets for which it does not have room, causing the information contained in those packets to be lost. Alternatively, if the congested state of switching element 325 is relieved during the period in which the backpressure signal is transmitted to upstream element 215, the backpressure signal is terminated and switching element 325 receives its packet. Many times, congested switching elements such as element 325 will volley between a congested and an uncongested state, causing the backpressure signal to be switched on and off.

A backpressure threshold is programmed into each upstream element and may depend on factors such as, but not limited to, the buffer size of the element, the number of input ports and output ports, and various traffic parameters, such as the offered load and burstiness of the traffic. A counter contained in the upstream switching element keeps track of when a packet enters or exits the element. When the number of packets in the element equals or exceeds the threshold value, the backpressure signal is ignored.

The use of a backpressure threshold has two important consequences. The first is that it allows the memory fabric 215 to temporarily store packets for the congested demultiplexor switching elements only when there is space in the fabric, i.e., prior to the fabric itself becoming congested. Secondly, instead of packets only being lost at the input lines to the fabric, packets are now lost at both the fabric and demultiplexor element stages.

By causing packets to be lost at the downstream switching element (e.g., demultiplexor stage), packets directed to the congested demultiplexor element are penalized so that other packets may reach those demultiplexor elements which are not congested. In conventional backpressure schemes, the congested switching element could ultimately cause upstream elements to become congested which prevented other downstream switching elements which were not congested to be unable to receive packets. For example, if packets destined for the congested element cause the fabric to become congested, other downstream switching elements are unable to receive packets destined for them and are unfairly penalized by the congested switching element which is monopolizing the switch.

Figure 4:
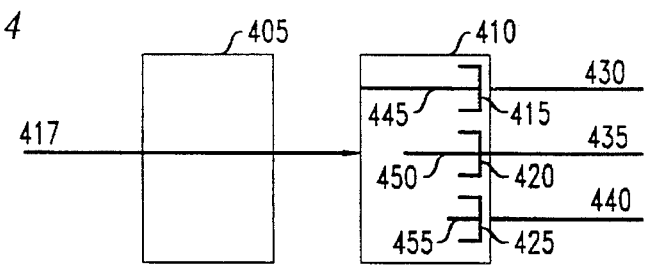
FIG. 4 is a diagram of a congested switching element which is subjected to a pushout scheme.

In accordance with an alternative embodiment of the present invention, a further way of managing the routing of packets within a given switching element is to incorporate an intrastage buffer management scheme in conjunction with the backpressure threshold scheme. An example of an intrastage buffer management scheme which may be implemented is a pushout scheme which is described in conjunction with FIG. 4. Intrastage buffer management schemes regulate the movement of packets within a stage by managing the competition between output queues within a given stage.

As described above, once the backpressure threshold has been reached in upstream switching element 405, the backpressure signal is ignored and packets are transported to downstream element 410. In accordance with the present invention, a pushout scheme is implemented which determines which packets in the downstream congested switching element will be lost, thereby penalizing congested output queues and allowing uncongested queues to continue to receive packets. As illustrated, the congested switching element 410 contains three output queues 415, 420 and 425 which are receiving packet streams 445, 450 and 455 respectively. The longest output queue 415 is primarily responsible for switching element 410 being congested.

Once the backpressure signal is ignored by the upstream switching element, switching element 410 continues to receive packets from switching element 405. Space is made in the local buffer of switching element 410 for the arriving packets by pushing out a packet from the longest output queue, in this case, queue 415. The new packet usurps the physical memory location of the pushed out packet, but the new packet can be directed to a different logical queue, such as queue 420. As such, the pushing and the pushed packets may be destined to different output ports and hence belong to different logical queues. The arriving packet joins the tail of the logical queue for its own output.

The pushout scheme allows the packets destined to the less congested output queues to find their way to their destinations at the expense of the packets in the longer queues in the congested element. The combination of the backpressure threshold and the pushout scheme causes the loss of packets to be shifted from the output queue of the fabric switching element to the congested demultiplexor switching element which can better manage the losses. If the losses are taken at the single output queue of the fabric switching element, packets are lost for all of the queues of the demultiplexor switching element. If the losses are taken at the congested demultiplexor switching element, the demultiplexor switching element can discriminate against the particular output queue which is causing the congestion.

Pushing out from the longest queue allows smaller queues to increase in length at the expense of longer queues. This creates a degree of fairness in the sharing of buffer space among the output queues. In the event that the upstream switching element 405 also becomes congested, that element can be subjected to the pushout scheme as well.

Other intrastage buffer management schemes which may be incorporated with the thresholded backpressure control scheme include, but are not limited to, allocation schemes and limit-based schemes. When such schemes are implemented, space is made in the local buffer memory of the congested switching element by dropping packets from the congested output queue. An allocation scheme allocates a small part of the local buffer memory of a given switching element to each of the output queues contained in the element. The remainder of the local buffer memory is shared by all of the output queues. If an output queue uses all of its allocated memory, the queue may use the shared memory. When the shared memory becomes full, an overflow condition results. Packets received by the congested element are dropped by the element and subsequently lost. When the thresholded backpressure scheme is used in conjunction with the allocation scheme, a backpressure signal is transmitted to the upstream element whenever the shared memory in the congested switching element is full.

A limit-based scheme causes a limit to be set on the length of each output queue in the local buffer memory. If an output queue reaches its limit, arriving packets destined for that queue are dropped. Arriving packets are also dropped if the local buffer memory is full, even though a particular output queue may not have reached its limit. When the thresholded backpressure scheme is used in conjunction with the limit-based scheme, the congested switching element sends a backpressure signal to the upstream element whenever at least one of the output queues in the congested element has exceeded its individual limit.

Figure 5:
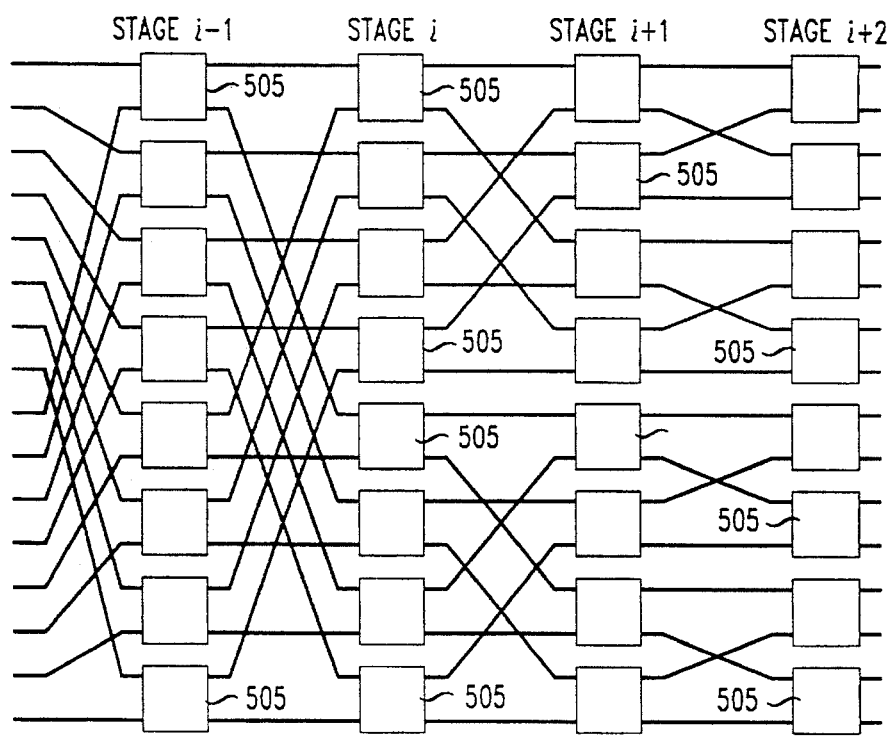
FIG. 5 is a diagram of a nonhierarchically arranged shared memory switch.

It will be appreciated that those skilled in the art will be able to devise numerous and various alternative arrangements which, although not explicitly shown or described herein, embody the principles of the invention and are within its scope and spirit. The thresholded backpressure scheme can be implemented in networks having different scheduling disciplines, delay priorities or loss priorities. In addition, the use of the thresholded backpressure scheme is not limited to a particular switch architecture and may be used in other switching architectures such as one which is comprised of nonhierarchically arranged switching elements 505 as is illustrated in FIG. 5. The switching elements 505 are arranged in multiple stages. Each switching element 505 contained within a stage i has a backpressure threshold to restrict the sharing of its local buffer memory with a downstream switching element in stage i+1. When the local buffer memory of a switching element 505 in stage i becomes full, the switching element sends a backpressure signal to all upstream switching elements in stage i−1 to which the switching element is connected.

We claim:

1. A method of regulating backpressure traffic in a packet switched network comprised of a plurality of switching elements, each switching element having a local buffer memory associated therewith, at least one of the switching elements succeeding at least one other switching element in a particular transmission path, said at least one succeeding switching element having a congested local buffer memory, the method comprising the steps of:

the succeeding switching element generating a backpressure signal;

transmitting the backpressure signal from the succeeding switching element to the at least one other switching element;

queuing packets destined for the succeeding switching element in the local buffer memory of the at least one other switching element in response to the backpressure signal;

determining when the occupancy of the local buffer memory for the other switching element has exceeded a predetermined threshold; and in response to exceeding the predetermined threshold, the other switching element transmitting the queued packets to the succeeding switching element.

2. The method according to claim 1 further comprising the step of:

the succeeding switching element employing a local buffer memory management scheme which determines the manner in which the local buffer memory of the succeeding switching element is managed when the other switching element has transmitted the queued packets thereto and when the local buffer memory of the succeeding switching element is congested.

3. The method according to claim 2 wherein each local buffer memory is comprised of a plurality of individual queues, each queue transmitting packets to a particular output port, and the step of employing a local buffer memory management scheme further comprising the steps of:

determining the lengths of each of the individual queues of the local buffer memory of the succeeding switching element;

determining which individual queue within the local buffer memory of the succeeding switching element is the longest; and providing space for the data transmitted to the local buffer memory of the succeeding switching element by pushing a packet from the longest individual queue out of the local buffer memory.

4. The method according to claim 1 wherein the packet switched network is a multistage packet switch.

5. The method according to claim 4 wherein said switch is of a hierarchical design.

6. The method according to claim 4 wherein said switch is of a non-hierarchical design.

7. The method according to claim 1 wherein each transmission path within the network is acyclic.

8. The method according to claim 2 wherein the packet switched network is a multistage packet switch.

9. The method according to claim 8 wherein said switch is of a non-hierarchical design.

10. The method according to claim 8 wherein said switch is of a hierarchical design.

11. The method according to claim 3 wherein each transmission path within the network is acyclic.

12. The method according to claim 1 wherein said packets are of variable length.

13. The method according to claim 1 wherein said packets are fixed length.

14. The method according to claim 1 further comprising the step of:

the other switching element employing a local buffer memory management scheme which determines the manner in which the local buffer memory of the other switching element is managed when the local buffer memory is congested as a result of queuing packets in response to the backpressure signal.

15. The method according to claim 14 wherein each local buffer memory is comprised of a plurality of individual queues, each queue transmitting packets to a particular output port, and the step of employing a local buffer memory management scheme further comprising the steps of:

determining the lengths of each of the individual queues of the local buffer memory of the other switching element;

determining which individual queue within the local buffer memory of the other switching element is the longest; and providing space for the data arriving to the local buffer memory of the other switching element by pushing a packet from the longest individual queue out of the local buffer memory.

16. The method according to claim 15 wherein the packet switched network is a multistage packet switch.

17. The method according to claim 16 wherein said switch is of a hierarchical design.

18. The method according to claim 16 wherein said switch is of a non-hierarchical design.

19. The method according to claim 15 wherein each transmission path within the network is acyclic.

20. A switching element for a packet switched network comprising:

a local buffer memory;

means for receiving a backpressure signal from a downstream switching element;

means for queuing packets destined for the downstream switching element in the local buffer memory when the backpressure signal has been received therefrom;

means for determining if the occupancy of the local buffer memory has exceeded a predetermined threshold; and means for transmitting the queued packets to the downstream element when the predetermined threshold has been exceeded.

* * * * *